United States Patent [19]
Graziano et al.

[11] Patent Number: 5,313,214
[45] Date of Patent: May 17, 1994

[54] SCALED MULTIPLE FUNCTION NONLINEAR FM WAVEFORM

[75] Inventors: Robert F. Graziano, Coram; Russell Singer, New York, both of N.Y.

[73] Assignee: Grumman Aerospace Corporation, Bethpage, N.Y.

[21] Appl. No.: 44,018

[22] Filed: Apr. 8, 1993

[51] Int. Cl.$^5$ .............................................. G01S 13/00
[52] U.S. Cl. .................................... 342/200; 342/201; 342/130; 342/132
[58] Field of Search ................. 342/200, 201, 132, 130

[56] References Cited
U.S. PATENT DOCUMENTS 5,070,337 12/1991 Chen et al. ......................... 342/201

OTHER PUBLICATIONS

Skolnik, "Introduction to Radar Systems", Chapter 11, McGraw-Hill, 1980.

*Primary Examiner*—Mark Hellner
*Attorney, Agent, or Firm*—Carl Evens; Richard G. Geib

[57] ABSTRACT

Scaled multiple function non-linear FM waveforms are generated for use in digitally implemented low frequency radar. The non-linear FM waveforms are generated by combining a plurality of functions, each having varying characteristics, to form a single waveform which has the desirable characteristics of weighted linear FM waveforms without the undesirable attributes due to weighting. Accordingly, the use of the non-linear FM waveform results in an increase in detection range of eight percent over existing linear FM waveforms with no degradation in range resolution.

18 Claims, 10 Drawing Sheets

SCALED MULTIPLE FUNCTION NONLINEAR FM WAVEFORM

BACKGROUND OF THE INVENTION

1. Field of the Invention

The present invention relates to the generation of waveforms for use in radar applications, and more particularly, to the generation of non-linear FM waveforms for use in digitally implemented low frequency radar.

2. Discussion of the Prior Art

Radar is an electromagnetic system for the detection and location of objects or targets. The basic concept underlying radar is the capture and analysis of a particular waveform which is transmitted from a source towards a target and reflected back towards the source. This reflected signal or echo is analyzed to determine certain information including the distance to the target, the position of the target, and the targets velocity. The distance to the target is calculated as a function of elapsed time between the transmission of the particular waveform and the reception of the reflected signal. The direction or angular position of the target is determined from the direction of arrival of the reflected waveform. If either the target or radar, or both are moving, i.e. relative motion, the shift in the carrier frequency of the reflected waveform is a measure of the target's relative velocity. This frequency shift is known as the Doppler shift principle and is well known in the art.

Radar can take on many forms and be utilized in a multitude of applications in the civil and military arena. Civil radar applications include air traffic control, aircraft and ship navigation, remote sensing applications including geological activity monitoring and weather front monitoring, and law enforcement i.e. the detection of speeding motorists. Many of the military radar applications are similar to the civil applications; however, the more traditional role of radar in military applications is in surveillance, navigation, and the control and guidance of weapons.

In the initial stages of radar development, radar was implemented utilizing analog components. However, with the advent of reliable digital processing techniques, radar is now implemented utilizing digital computers or digital processors. Digitally implemented radar does not per se provide superior results over their analog counterparts; however, digitally implemented radar are typically more reliable, require less continuous adjustment, and provide information more efficiently and in a more convenient format.

Current radars employ the use of a weighted function, such as Hamming or Dolph-Chebychev, in digital pulse compression to lower the range-time sidelobes to a desired level thereby minimizing false target detection. For example, a linear FM signal which is unweighted will result in a compressed pulse with a mainlobe to peak sidelobe level of only 13 dB. Applying Hamming weights to the reference linear FM signal will result in a compressed pulse having an improved mainlobe to sidelobe ratio of 43 dB. These results apply to a 204.8 microsecond pulse sampled at 5 MHz and having a 4 MHz signal bandwidth. However, having this weighting function applied to the reference linear FM signal creates a loss in the reference signal as well as a mismatch between the reference and receive spectrums. This causes a 1.34 dB loss in signal to noise while also broadening the compressed pulsewidth. A 1.34 dB loss in signal to noise translates to a decrease in detection range of approximately eight percent which is a significant decrease in any radar application.

SUMMARY OF THE INVENTION

The present invention is directed to a method for generating a scaled multiple function non-linear FM waveform for use in digitally implemented low frequency radar. The method comprises three basic steps. The first step in the process is the generation of at least two functions. One of the functions having a characteristic for providing a compressed pulse with a predetermined mainlobe to sidelobe ratio and a second of the functions having a characteristic for providing a compressed pulse with a predetermined pulse width. The functions utilized in the present invention to provide the above described characteristics include tangent functions and odd order polynomials. Other functions can also be utilized to achieve the desired characteristics; however, these other functions must be similar in shape to the tangent or odd order polynominal functions. It is possible to utilize a single function (i.e. tangent or odd ordered polynomial); however, optimal results such as those obtained by using multiple functions could not be achieved. The optimal results being a compressed pulse having a mainlobe to sidelobe ratio greater than or equal to that of a weighted linear FM signal, and a compressed pulsewidth less than or equal to that of a weighted linear FM signal while suffering no weighting loss. In the present invention, this translates into a 45 dB mainlobe to sidelobe ratio and a 1.34 dB improvement in signal to noise over existing systems. The second step in the process is the scaling of the functions generated in the previous step. Each function is scaled to emphasize the particular characteristic associated with that particular function. The scaling step is required for functions with one degree of freedom, for example, an $n^{th}$ order polynomial. The scaling function may or may not be required for functions having multiple degrees of freedom such as a tangent function. In utilizing other types of functions, such as a tangent function, it is possible to emphasize the desired characteristic by choosing a specific portion of the function, for example, tangent angle endpoints. The third step in the process is optimally combining the functions which have been scaled or correctly chosen to generate the non-linear FM waveform. An additional step is needed when there is relative movement between the radar and the target. The additional step involves correcting Doppler shift degradation in the waveform by weighting the functions as a function of the Doppler shift frequency and/or by varying the functions themselves.

The scaled, multiple function non-linear FM waveform of the present invention is generated by the combination of multiple tangent, odd order polynomial functions or functions of a shape similar to that of a tangent function or odd order polynominal to form a single modulation. This non-linear FM waveform provides for a compressed pulse having a 45 dB mainlobe to sidelobe ratio without experiencing a weighting loss which is inherent in present systems which utilize weighted linear FM waveforms. This non-linear FM waveform also provides for a compressed pulse having a signal to noise ratio improvement of 1.34 dB over existing systems, which translates into an approximately eight percent improvement in detection range. In addition, there is no appreciable difference in compressed pulse width and therefore, the discrimination capabilities of the radar are not diminished.

In utilizing scaling weights in conjunction with multiple functions provides for the generation of a multitude of non-linear FM waveforms. By varying the scaling weights and optimally combining the functions, a non-linear waveform can be generated having a finely tuned pulse shape, and one that is virtually insensitive to Doppler shift effects. Accordingly, the non-linear FM waveform can be utilized in a wide variety of digitally implemented low frequency radar applications such as airborne surveillance. Once the non-linear waveform having the desired characteristics is generated it can be implemented on existing systems. Therefore, improved performance is achieved at a minimum cost.

DESCRIPTION OF THE PREFERRED EMBODIMENT

The scaled, multiple function non-linear FM waveform of the present invention, which can be utilized in digitally implemented low frequency radar applications such as airborne surveillance, provides for an approximately eight percent increase in detection range over traditionally weighted linear FM waveforms while maintaining a usable compressed pulse. Current radar utilize a weighted function in digital pulse compression to lower the mainlobe to sidelobe ratio to a desirable level. However, when this weighting function is applied to a reference linear FM waveform, it creates a loss in the reference signal as well as a mismatch between the reference and receive spectrums, thereby resulting in a 1.34 dB loss in signal to noise and a broadening of the compressed pulse width. The 1.34 dB loss translates into a decrease in range detection of approximately eight percent, and the broadening of the compressed pulse results in a decrease in range resolution.

Figure 1:
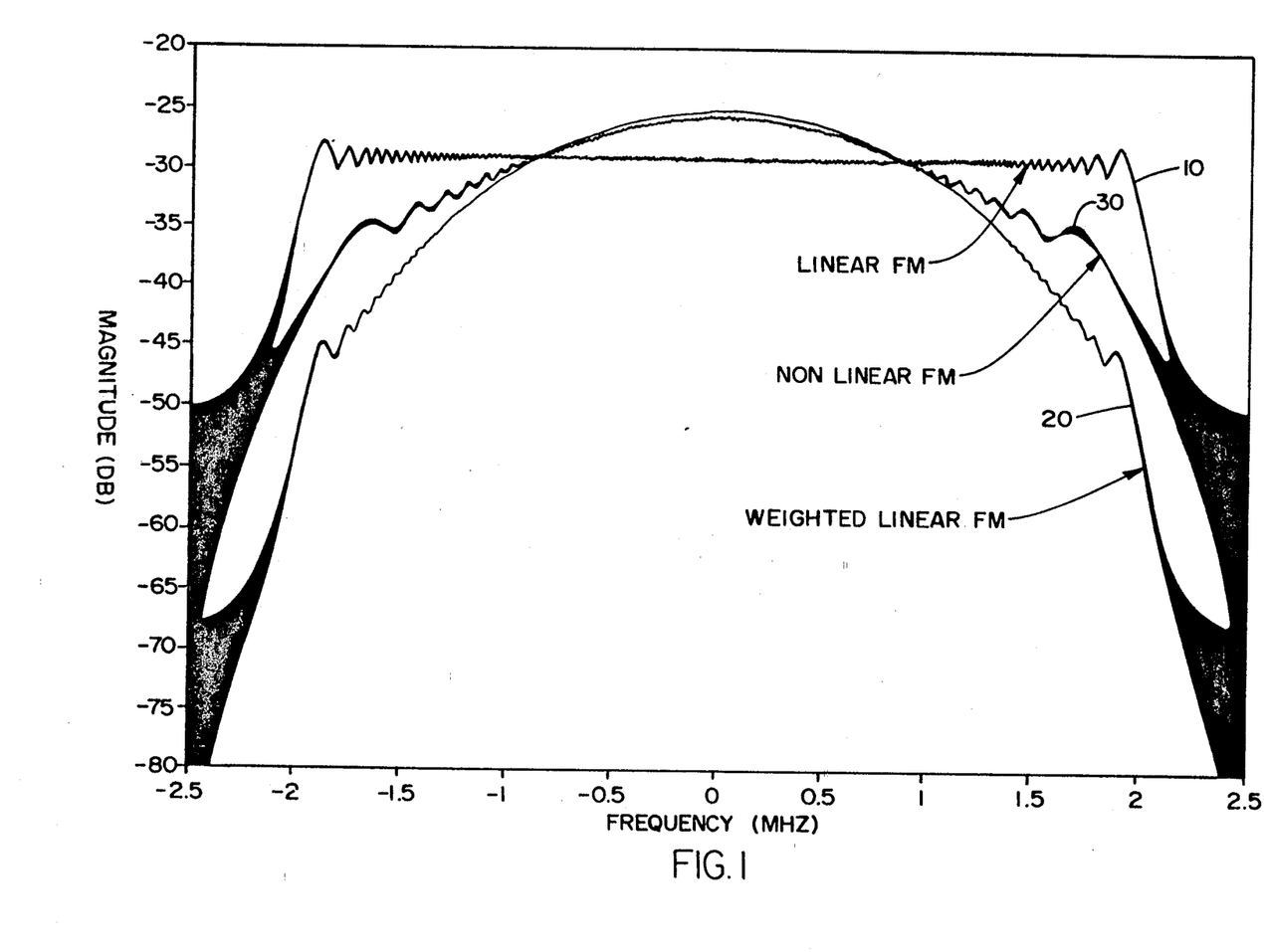
FIG. 1 is a graphic representation of the spectrum of a linear FM waveform, a weighted linear FM waveform, and the non-linear FM waveform of the present invention.

The loss due to weighting is eliminated by generating a non-linear FM signal in which the reference and received spectrums are equivalent and maintain a shape similar to that of a weighted linear FM signal. Referring to FIG. 1, there is shown the spectrum for a linear FM waveform 10, a weighted linear FM waveform 20, wherein the weights are normalized, and non-linear FM waveform 30. As is seen from a comparison of the three waveforms 10, 20 and 30, the characteristics of a weighted linear FM waveform; namely, a greater than 40 dB mainlobe to sidelobe ratio, can be maintained without suffering the signal to noise loss because there is no weighting function. The non-linear FM waveform 30 is carefully constructed in order to maintain a low sidelobe level while minimizing the broadening of the compressed pulse width and the degradation due to the possible Doppler effect on the received signal. A tradeoff exists in that these design parameters are indirectly related to one another; accordingly, in attempting to generate a waveform in which a low sidelobe level is maintained, a waveform having a broader compressed pulse width results.

Figure 2:
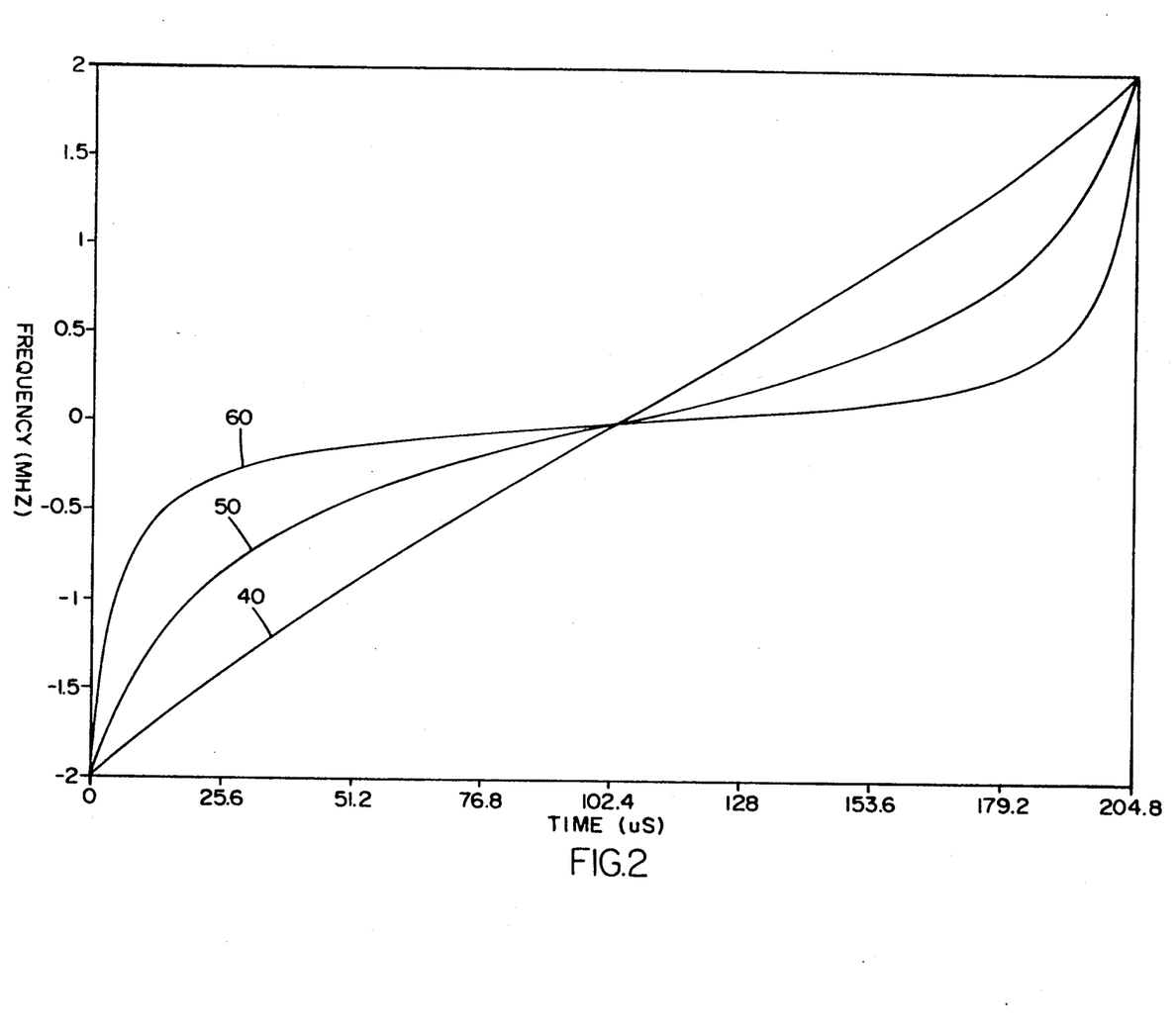
FIG. 2 is a graphic representation of three tangent frequency modulations which are combined to form the non-linear FM waveform of the present invention.

The scaled multiple function non-linear FM waveform achieves the desired results by combining the attributes of several modulation shapes into a single waveform. In the present embodiment, the non-linear FM waveform in generated by a combination of three modulation waveforms. It is important to note, however, that the non-linear FM waveform can be generated from any number of waveforms, but the process becomes increasingly more difficult as more waveforms are utilized. Referring now to FIG. 2, there is shown a plot of three frequency modulations which are combined to generate the non-linear FM waveform of FIG. 1. Each modulation is a tangent function scaling the amplitude of the tangent function to a specified bandwidth and the tangent angle endpoint to a specified pulse width. The three modulations are plotted as a function of time (pulse width in microseconds) versus frequency (bandwidth in megahertz). The first tangent frequency modulation 40 which is nearly linear represents a small tangent angle endpoint. Recalling the tangent function, its values are nearly linear for tangent angles of between 0 and 40 degrees and 0 and −40 degrees. Accordingly, using angles in this range results in a nearly linear curve as illustrated by the first tangent frequency modulation 40. The second tangent frequency modulation 50, which is more non-linear than modulation 40, represents a larger tangent angle endpoint. Using tangent endpoint angles in the range between 60 and 70 degrees and −60 and −70 degrees results in the second tangent frequency modulation 50. The third tangent frequency modulation 60 which is the most non-linear of the three represents an even larger tangent angle endpoint. Using tangent endpoint angles in the range between 80 and 89 degrees and between −80 and −89 degrees results in the third tangent frequency modulation 60.

The tangent angle endpoint varies for each modulation curve, thereby resulting in unique compressed pulse characteristics for each curve. For example, a flat modulation tending towards linear, created utilizing a small tangent angle endpoint, as illustrated by the first tangent frequency modulation 40 will result in a compressed pulse with a desirable narrow compressed pulse width. However, the compressed pulse will also have unreasonably high sidelobes. Accordingly, in utilizing this single function, a high level of range resolution is achieved, but at the expense of a high probability of false target recognition. Conversely, a deep curved modulation, created utilizing a large tangent angle endpoint, as illustrated by the third tangent frequency modulation 60 will result in desirably low sidelobe levels, but unusable broad compressed pulse widths. Accordingly, in utilizing this single function, the probability of false target recognition is lowered, but at the expense of decreased range resolution. By optimally combining the characteristics of each modulation, a single modulation function can be constructed which provides the desirable attributes of each individual function while minimizing the undesirable characteristics.

Figure 3:
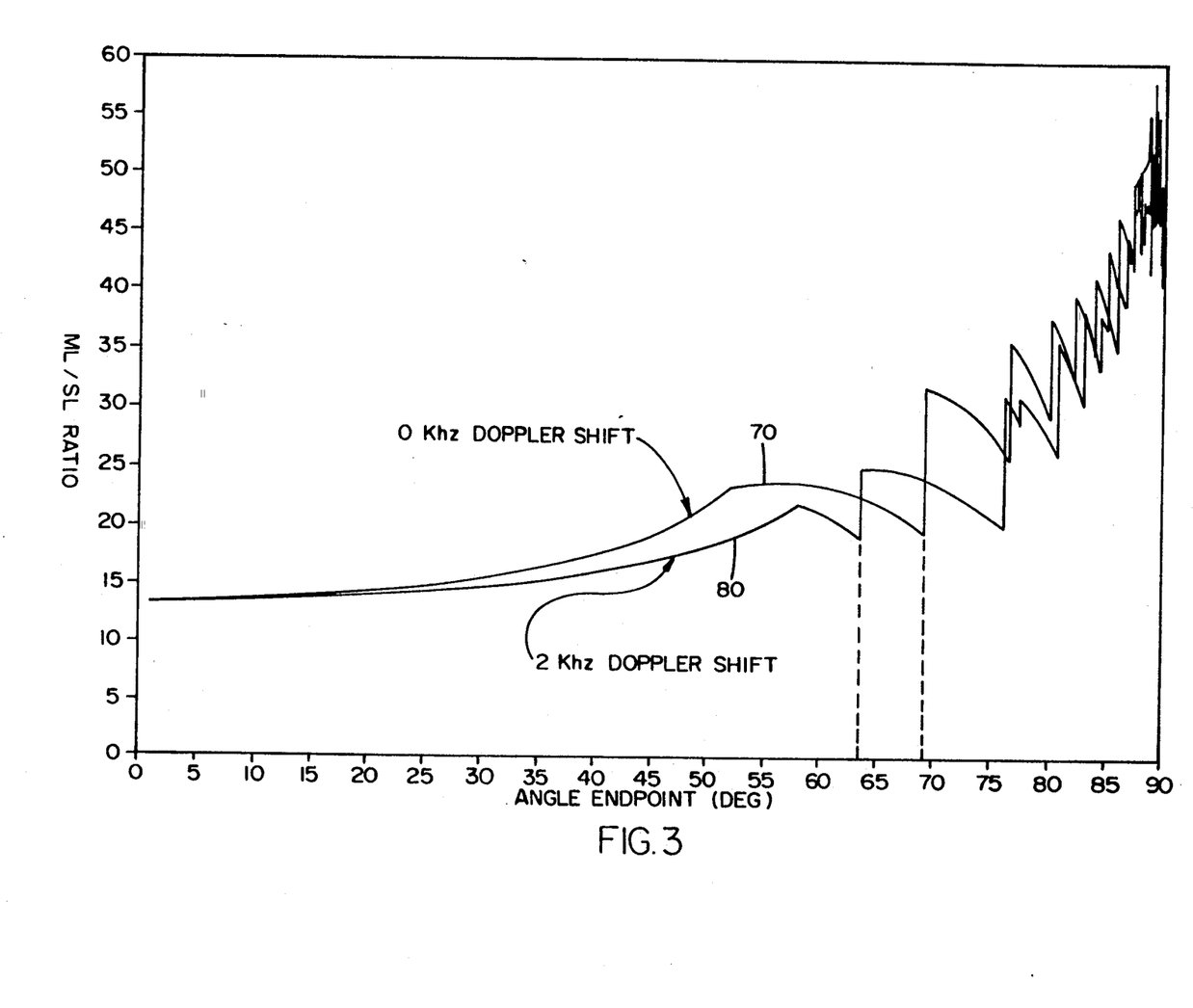
FIG. 3 is a graphic representation of a tangent function mainlobe to sidelobe ratio versus tangent angle endpoint curve for a 204.8 micro second pulse sampled at 5 MHz and having a 4 MHz signal bandwidth.
Figure 4:
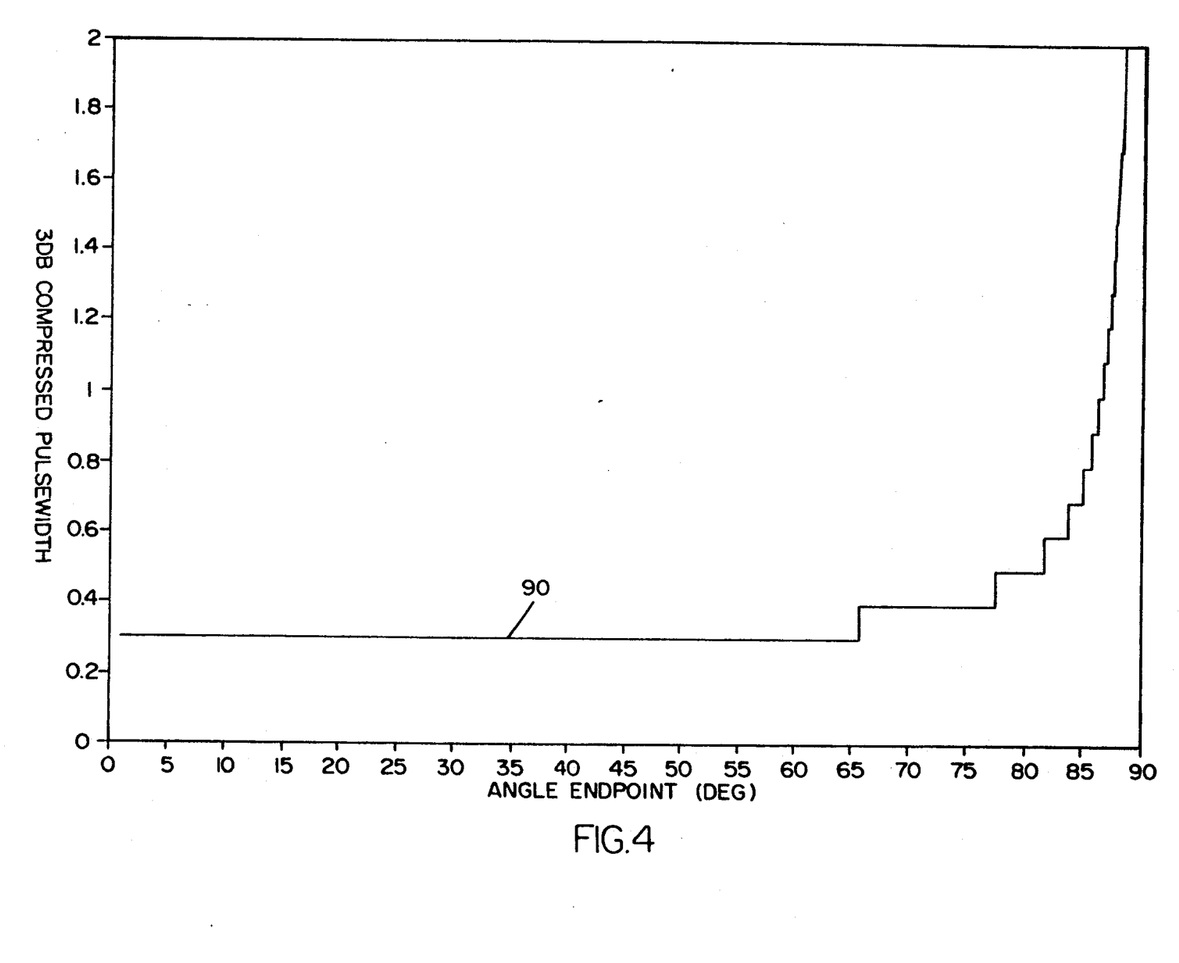
FIG. 4 is a graphic representation of a tangent function 3 dB compressed pulsewidth versus tangent angle endpoint curve for a 204.8 micro second pulse sampled at 5 MHz and having a 4 MHz signal bandwidth.

FIGS. 3 and 4 illustrate plots of mainlobe to sidelobe ratio versus tangent angle endpoint and 3 dB compressed pulse width versus tangent angle endpoint respectively. Both FIGS. 3 and 4 apply to a 204.8 microsecond pulse sampled at 5 MHz and having a 4 MHz signal bandwidth. However, it should be apparent to those skilled in the art that the same process can be applied to pulses having varying parameters or characteristics. FIG. 3 shows two plots 70 and 80, one having a 0 KHz Doppler shift applied thereto and the other having a 2 KHz Doppler shift applied thereto. At this point, reference shall only be made to plot 70, as a complete description of the Doppler effect is given subsequently. FIG. 4 shows only a single plot 90 because the Doppler effect has no significant bearing on the pulse width. A desirable compressed pulse would have a mainlobe to sidelobe ratio of 40 dB or more and a compressed pulse width of 0.4 microseconds or less. The weighted linear FM waveform has these desirable characteristics, but as previously discussed, in order to achieve these characteristics a loss in range resolution occurs due to the weighting. Utilizing a single tangent function with a tangent angle endpoint of 85 degrees or more would satisfy the mainlobe to sidelobe ratio requirement as is shown in FIG. 3; however, a tangent angle endpoint of 85 degrees or more would result in a 3 dB compressed pulse of over 0.8 microseconds as illustrated in FIG. 4. Tangent angle endpoints lower than 75 degrees would satisfy the 3 dB pulse width requirement as in illustrated in FIG. 4, but would result in a mainlobe to sidelobe ratio of 30 dB, as is illustrated in FIG. 3. Therefore, utilizing a single tangent function of any angle endpoint will not satisfy both design criteria.

Therefore, the solution for a 204.8 microsecond pulse sampled at 5 MHz and having a 4 MHz bandwidth lies in combining tangent functions having tangent angle endpoints in the range of 30–40 degrees, 60–70 degrees, and 80–89 degrees. Tangent functions having angle endpoints in these three ranges are plotted in FIG. 2. The resulting combination of the tangent functions is a modulation which highlights the favorable attributes of each individual function. Determining the optimum combination of tangent angle endpoints, and scaling weights, which is discussed subsequently, is an iterative process. There exists a unique combination of tangent angle endpoints and scaling weights for each particular set of waveform parameters desired. These parameters include pulse length, sampling rate, bandwidth, and maximum anticipated Doppler shift. The Doppler shift problem is discussed in subsequent sections.

A mathematical expression for the phase term of an $n^{th}$ order modulation is given by $$\omega = 2\pi \left[ f_o t - \frac{BW \cdot T}{4} \sum_{i=1}^{4} W_i \frac{\ln \left| \cos \left( \alpha_i \left( \frac{2t}{T} - 1 \right) \right) \right|}{\alpha_i \cdot \tan \alpha_i} \right], \quad (1)$$

where BW is the bandwidth of the function, $f_o$ is the carrier frequency, T is the period, $W_i$ is a scaling weight, t is time, and $\alpha_i$ is a tangent angle endpoint. The phase expression given in equation (1) is a summation of n tangent functions, where each tangent function scales the amplitude of the tangent function to a specified bandwidth and the n tangent angle endpoints to a specified pulse width. The phase term is derived by integrating an expression for the frequency of an $n^{th}$ order modulation which is given by $$f = f_o + \frac{BW}{2} \left[ \sum_{i=1}^{n} W_i \frac{\tan \left( \alpha_i \left( \frac{2t}{T} - 1 \right) \right)}{\tan \alpha_i} \right]. \quad (2)$$

The frequency expression of equation (2) is simply the carrier frequency plus a modulation term which is derived from the combination of tangent functions. The phase expression given in equation (1) is implemented in the expression for the radar signal which is given by $$s = e^{j\omega}, \quad (3)$$

or by using Euler's identity, the expression for the radar signal is given by $$s = \cos \omega + j \sin \omega. \quad (4)$$

The scaling weights, $W_i$, are utilized to establish more or less emphasis on the particular characteristics of each tangent function. Accordingly, each tangent function is multiplied by a particular scaling weight as is shown in equation (1). In practice the sum of all scaling weights is normalized to a value of unity for simplicity.

It is important to note that an $n^{th}$ order polynomial or combination of polynomials can be utilized, as opposed to the tangent functions described above, to vary the shape of the modulation. Only odd order polynomials should be utilized because even order polynomials do not take negative turns. Odd order polynomials such as $x$, $x^3$, and $x^5$ take negative turns in a manner similar to that of the tangent functions previously described. For example, the first order polynomial, x, is a straight line similar to curve 40 in FIG. 2. The frequency of an $n^{th}$ order modulation utilizing polynomials is given by $$f = f_o + \frac{BW}{2} \left[ \sum_{i=1}^{n(\text{odd})} W_i \left( \frac{2t}{\tau} - 1 \right)^i \right], \quad (5)$$

where $\tau$ is the bandwidth of the polynomial. Tangent functions are preferred over polynomials because of the tangent function's ability to create unlimited degrees of freedom; namely, tangent angle endpoints, and are easier to manipulate. In addition, tangent functions are better suited to create a flat modulation in the center of the bandwidth, which is desirable for this particular application.

Figure 5:
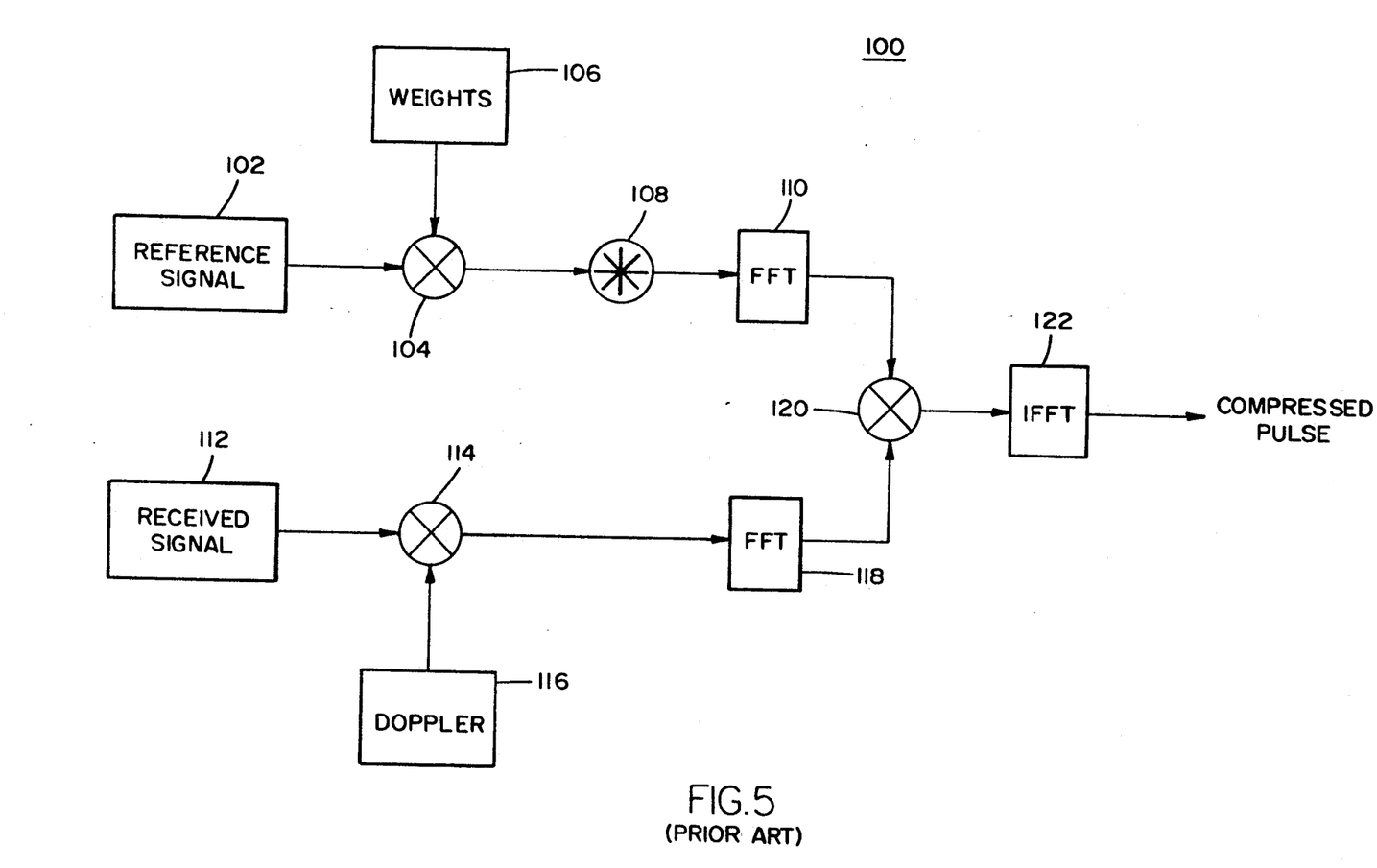
FIG. 5 is a block diagram of a digitally implemented matched filter model.

Referring now to FIG. 5, there is shown a block diagram of a matched filter processor 100 for the processing of radar signals. The matched filter processor 100 is not implemented utilizing discrete components or elements as shown in FIG. 5, but rather as specific software routines on a digital processor. However, for purposes of describing its operation, reference will be made to the individual elements in the figure as if there were in fact discrete components or elements. In present radar systems, the reference signal 102 is input to a multiplier 104 wherein the weighting functions, supplied by element 106, are applied to the reference signal 102. The complex conjugate of the weighted reference signal output from the multiplier 104 is calculated by complex conjugate element 108 and subsequently Fourier transformed by a Fast Fourier Transform element 110. The received signal or echo 112 from the target is input to a second multiplier 114 wherein a Doppler frequency shift supplied by element 116 is applied to the received signal 112 if there is a Doppler shift present. As stated previously, a complete description of Doppler compensation is given subsequently. The shifted received signal is Fourier transformed by a second Fast Fourier Transform element 118 and input into a multiplier 120 where it is multiplied with the weighted reference signal. The product is then inversely Fourier transformed by an inverse Fast Fourier Transform element 122 thereby resulting in a compressed pulse which is now in a form suitable for further processing and analysis. The difference between the standard implementation of weighted linear FM signals and the present invention is that of factoring in the weights. Accordingly, with a simple modification i.e. the elimination of element 106, the present invention can be implemented on existing digital systems, and achieve superior results.

Figure 6:
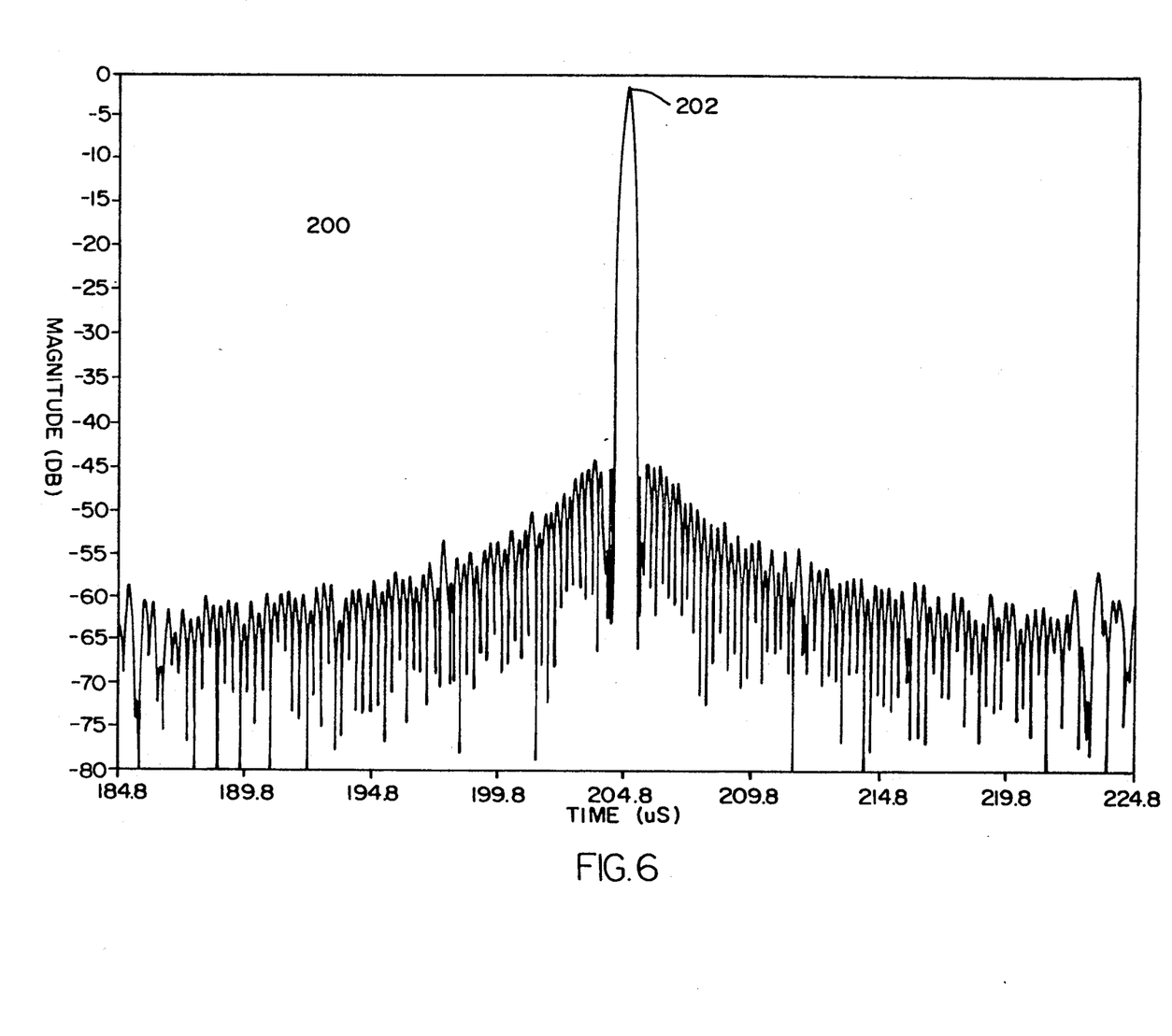
FIG. 6 is a graphic representation of a compressed pulse generated by a linear FM signal weighted with Hamming weights.
Figure 7:
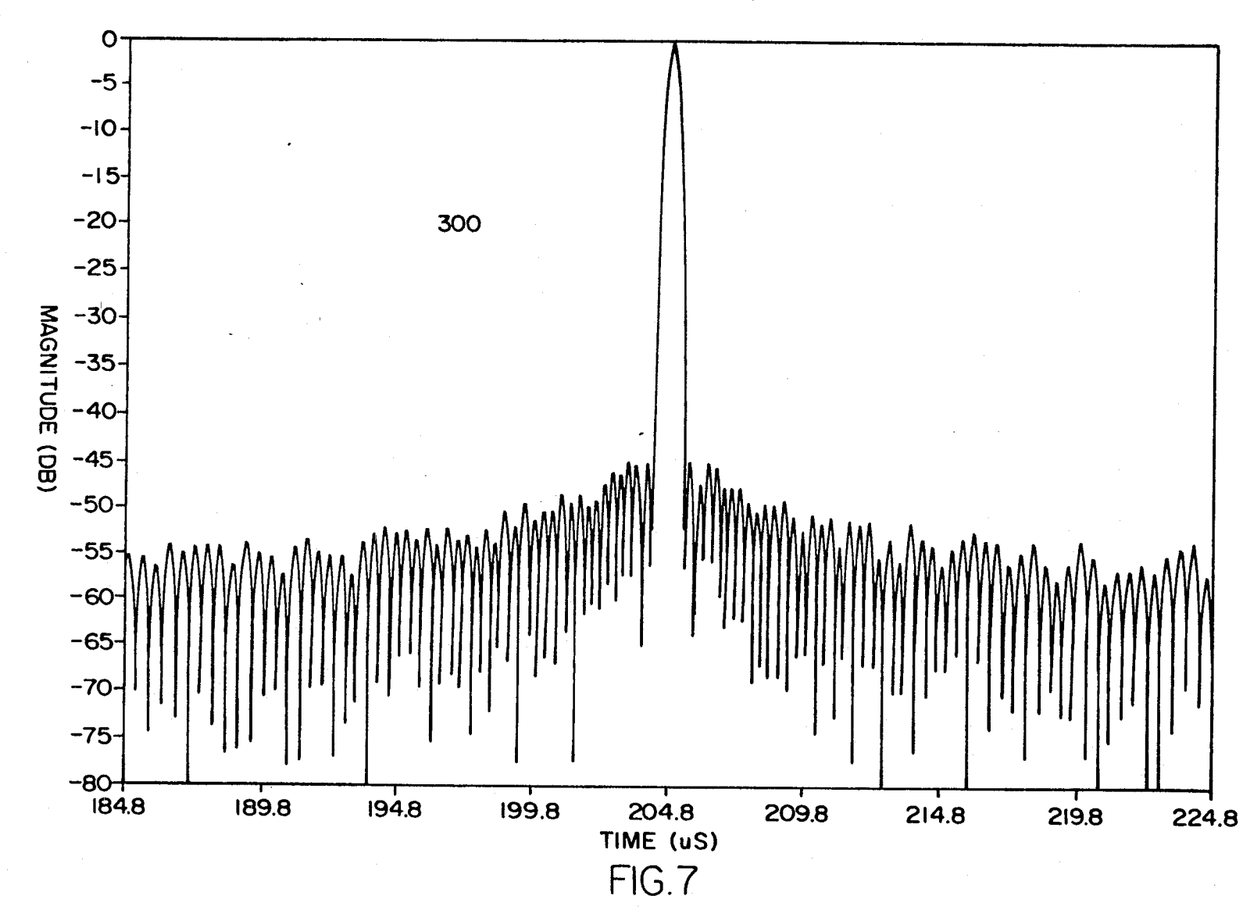
FIG. 7 is a graphic representation of a compressed pulse generated by the non-linear FM waveform of the present invention.

A compressed pulse 200 utilizing a linear FM signal with Hamming weights is illustrated in FIG. 6, and a compressed pulse 300 utilizing the non-linear FM signal of the present invention is illustrated in FIG. 7. To generate the compressed pulses 200 and 300, the waveforms are run through the matched filter processor 100 of FIG. 5. The weights are normalized such that the root means square (RMS) noise through the matched filter processor 100 of FIG. 5 is equal for both of the waveforms so that a fair comparison of signal to noise can be made. The results plotted in FIG. 6 and 7 are normalized for plotting comparison such that unweighted results in a peak of 0 dB, and apply to a 204.8 microsecond pulse and a 4 MHz bandwidth. Based upon these parameters, a Hamming weighted linear FM signal will result in a compressed pulse having a width of 0.4 microseconds, a mainlobe to sidelobe ratio of 42.5 dB, and a signal to noise loss of 1.35 dB as indicated in FIG. 6 by the space above the peak 202 of the signal. The non-linear FM waveform results in a compressed pulse having a width of 0.4 microseconds, a mainlobe to sidelobe ratio of approximately 45 dB, and most significantly, no loss is signal to noise. The unnormalized results of the comparison are listed in the Table below.

TABLE

| NON-LINEAR FM VS. WEIGHTED LINEAR FM 1024:1 5 MHZ | | |
|---|---|---|
| | NLFM | LFM WEIGHTED |
| SIGNAL (PEAK) | 60.20 dB | 58.86 dB |

TABLE -continued

| NON-LINEAR FM VS. WEIGHTED LINEAR FM 1024:1 5 MHZ | | |
|---|---|---|
| | NLFM | LFM WEIGHTED |
| NOISE (RMS) | 32.90 dB | 32.90 dB |
| S/N GAIN | 27.30 dB | 25.96 dB |

1.34 dB SIGNAL TO NOISE IMPROVEMENT
8% DETECTION RANGE IMPROVEMENT

Figure 8:
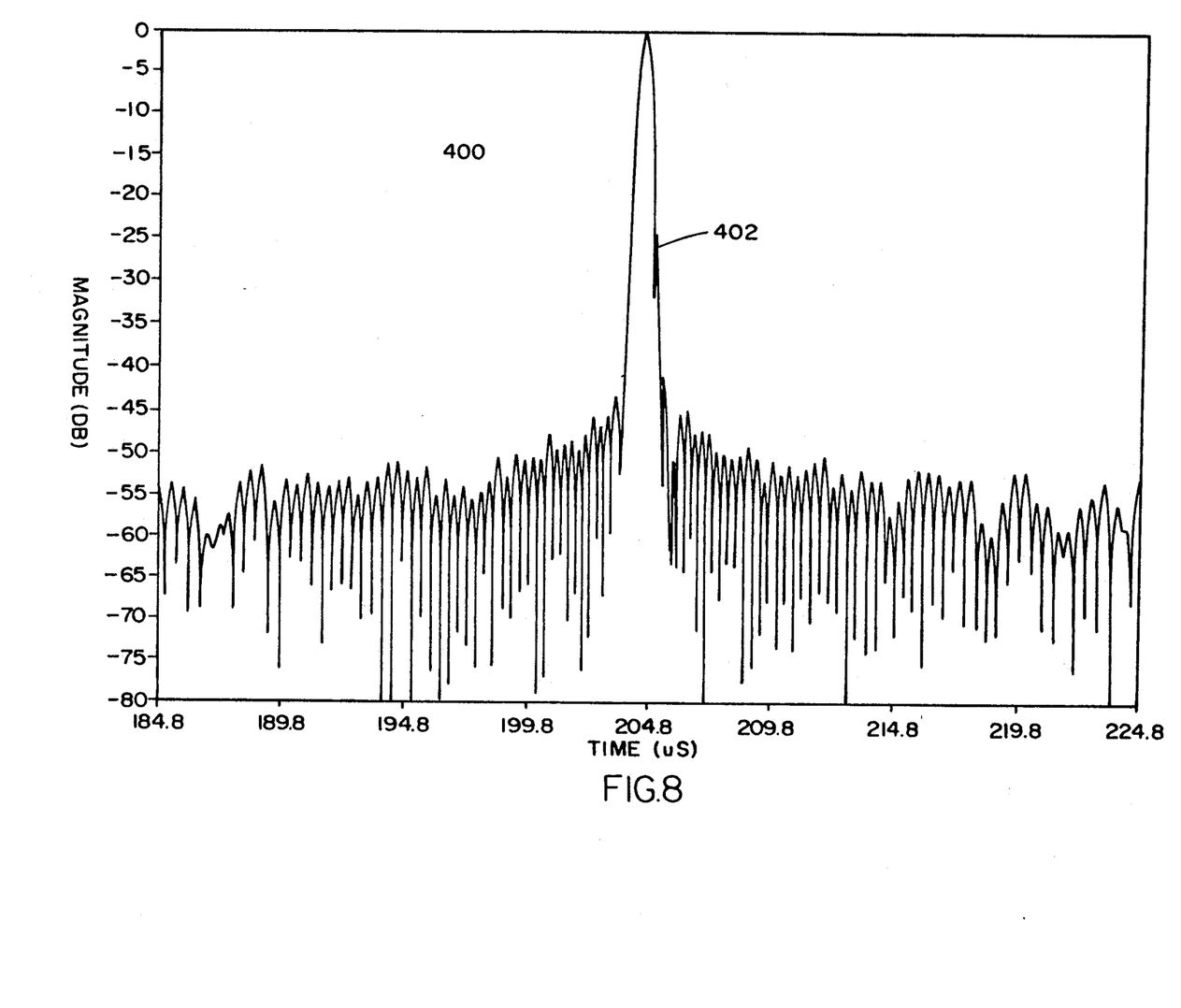
FIG. 8 is a graphic representation of a compressed pulse generated by the non-linear FM waveform of the present invention with a 2 KHz Doppler shift added to the received signal.
Figure 9:
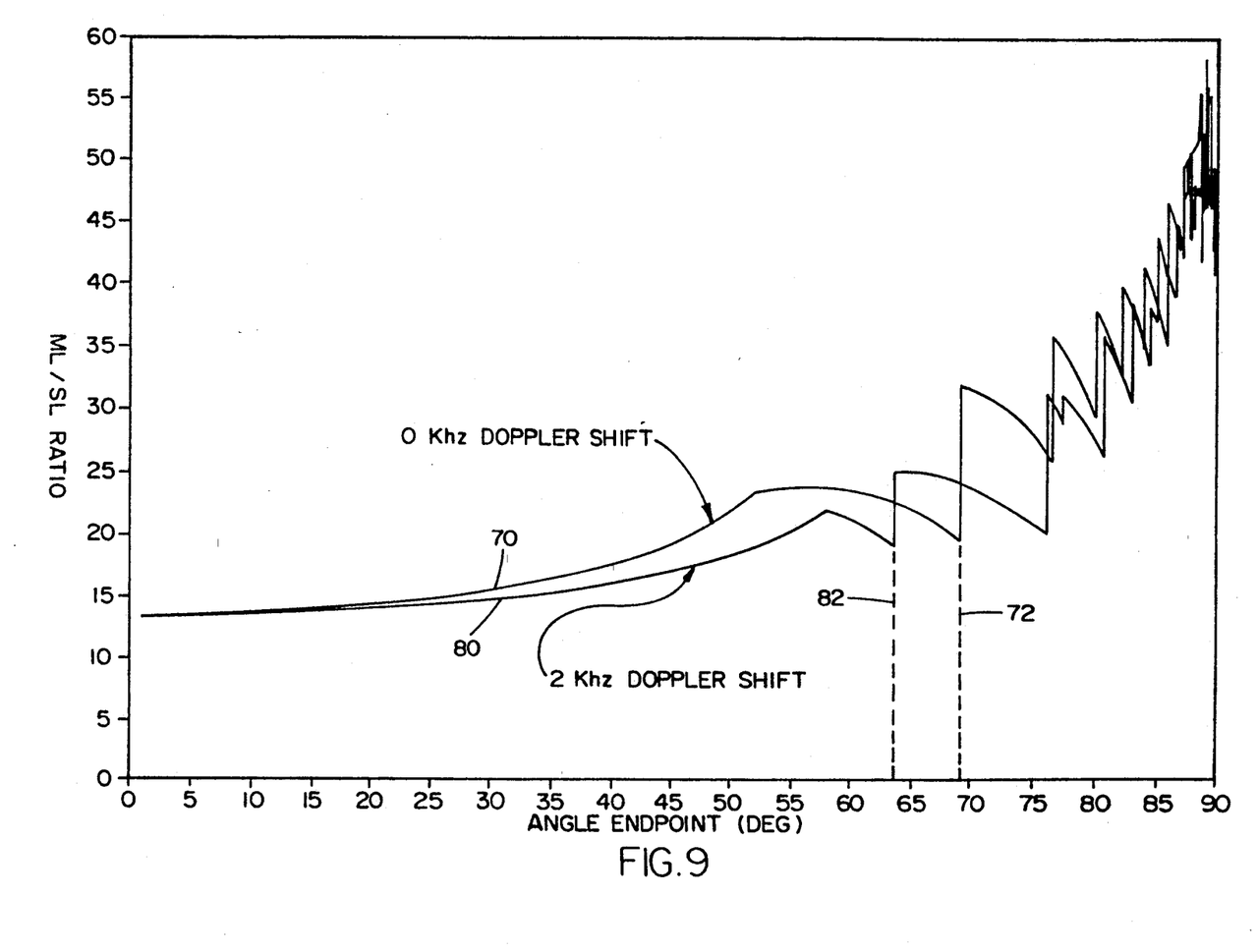
FIG. 9 is a graphic representation of a tangent function mainlobe to sidelobe ratio versus tangent angle endpoint curve having a 0 KHz and 2 KHz Doppler shift applied thereto.
Figure 10:
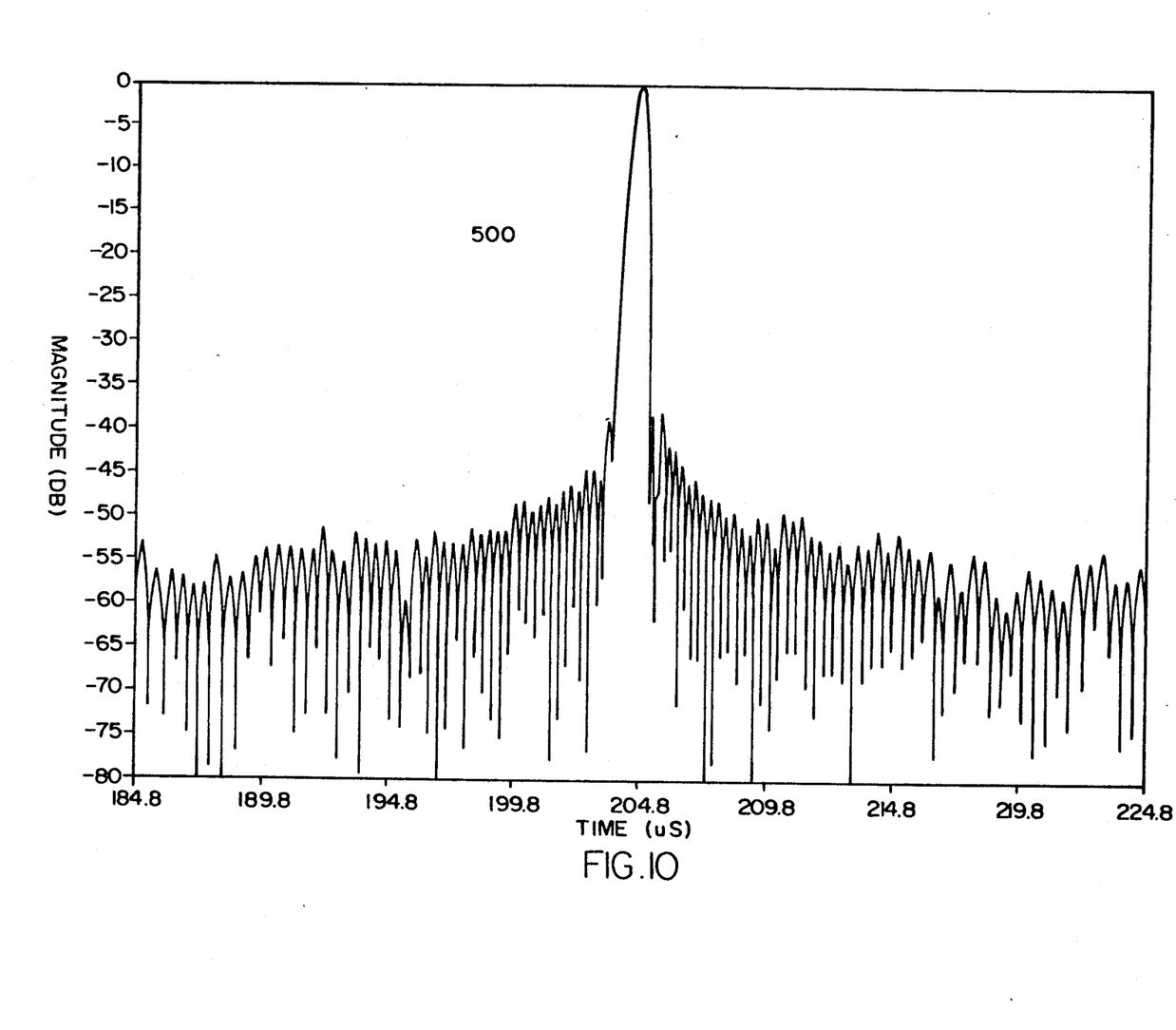
FIG. 10 is a graphic representation of a compressed pulse having Doppler compensation generated by the non-linear FM waveform of the present invention.

A characteristic of the non-linear FM waveform is that the compressed pulse shape is generally sensitive to target Doppler shift. Referring now to FIG. 8, there is shown a plot of the compressed pulse 400 in which a 2 KHz Doppler shift has been applied to the received signal. A 2 KHz Doppler shift is equivalent to approximately a Mach 2 target velocity at ultra high frequency. This mismatch in the shifted received and unshifted reference signals causes a near-in sidelobe 402 with a level of 24 dB, which is 21 dB higher than the 45 dB level achieved in the unshifted case as illustrated in FIG. 7. This high sidelobe 402 can create problems in false target detection. Depending upon the threshold level of the detector, the high sidelobe 402 may be detected and indicated as a second target. This high sidelobe 402 does not occur with the weighted linear FM signal. However, the high sidelobe problem can be corrected in the non-linear FM waveform by utilizing an analysis of compressed pulse mainlobe to sidelobe levels versus tangent functions with varying tangent angle endpoints as was done in FIG. 3. FIG. 9 illustrates plots of mainlobe to sidelobe ratio versus tangent angle endpoint for a 0 KHz Doppler shifted received signal 70 and a 2 KHz doppler shifted received signal 80 respectively. As is shown in the figure, a Doppler shift degrades the mainlobe to sidelobe level throughout the tangent angle endpoint range. However, there is a short interval of tangent angle endpoints, from 63 to 69 degrees, as indicated between dotted lines 72 and 82, in which the Doppler shift improves the peak mainlobe to sidelobe level. Accordingly, this range is emphasized to correct the Doppler shift degradation by adjusting the tangent angle endpoints and/or appropriately applying the scaling weights to put greater emphasis on this interval. This Doppler compensation method increases the 2 KHz mainlobe to sidelobe ratio 14 dB from 24 dB uncompensated to 38 dB compensated. The desired compressed pulse width is also maintained during the Doppler shift. The Doppler compensated 2 KHz compressed pulse 500 in illustrated in FIG. 10.

The expression for the received signal requires a modification of the phase term of the $n^{th}$ order modulation given by equation (1) to correctly represent the effect of the Doppler shift. The modification simply requires the addition of a new frequency term. The expression for the received signal is given by $$\omega = 2\pi \left[ f_{o'} - \frac{BW \cdot T}{4} \sum_{i=1}^{n} W_i \frac{\ln \left| \cos \left( \alpha_i \left( \frac{2t}{T} - 1 \right) \right) \right|}{\alpha_i \cdot \tan \alpha_i} + f_d t \right], \quad (6)$$

where $f_d$ is the Doppler shift frequency. Referring to FIG. 5, equation (6) corresponds to the signal output from the second multiplier 114.

Although shown and described in what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere of all modifications that may fall within the scope of the appended claims.

What is claimed is:

1. A method for generating a scaled multiple non-linear FM waveform for use in digitally implemented low frequency radar, said method comprising the steps of:
   (a) generating at least first and second functions, wherein said first function having a characteristic for providing a compressed pulse with a predetermined mainlobe to sidelobe ratio and said second function having a characteristic for providing a compressed pulse with a predetermined pulse width; and
   (b) optimally combining said at least first and second functions into a single waveform.

2. The method for generating a scaled multiple function non-linear FM waveform according to claim 1, further comprising the step of scaling said at least first and second functions prior to optimally combining them for emphasizing the particular characteristic of each.

3. The method for generating a scaled multiple function non-linear FM waveform according to claim 2, further comprising the step of correcting for Doppler shift degradation in said waveform.

4. The method for generating a scaled multiple function non-linear FM waveform according to claim 3, wherein said step of generating at least first and second functions comprises generating at least first and second tangent functions wherein each tangent function scales the amplitude to a specified bandwidth and the tangent angle endpoint to a specified pulse width.

5. The method for generating a scaled multiple function non-linear FM waveform according to claim 4, wherein said step of scaling said at least first and second functions comprises multiplying each function by a scaling weight, wherein the sum of all scaling weights is equal to unity.

6. The method for generating a scaled multiple function non-linear FM waveform according to claim 5, wherein said step of optimally combining is a process comprising summing said at least first and second tangent functions for varying tangent angle endpoints according to the equation given by $$\omega = 2\pi \left[ f_o t - \frac{BW^*T}{4} \sum_{i=1}^{4} W_i \frac{\ln \left| \cos \left( \alpha_i \left( \frac{2t}{T} - 1 \right) \right) \right|}{\alpha_i{}^* \tan \alpha_i} \right],$$

wherein $\omega$ is the phase of the single waveform.

7. The method for generating a scaled multiple function non-linear FM waveform according to claim 3, wherein said step of correcting Doppler shift degradation comprises weighting said at least first and second functions to compensate for mainlobe to sidelobe level degradation due to a particular Doppler shift frequency.

8. The method for generating a scaled multiple function non-linear FM waveform according to claim 3, wherein said step of correcting Doppler shift degradation comprises adjusting the tangent angle endpoints to compensate for mainlobe to sidelobe degradation due to a particular Doppler shift frequency.

9. The method for generating a scaled multiple function non-linear FM waveform according to claim 7, wherein said step of weighting comprises multiplying each function by a weighting factor, wherein said weighting factors are selected as a function of Doppler shift frequency.

10. The method for generating a scaled multiple functions non-linear FM waveform according to claim 3, wherein said step of generating at least first and second functions comprises generating at least first and second polynomials of odd order.

11. A method for generating a scaled multiple function non-linear FM waveform for use in digitally implemented low frequency radar, said method comprising the steps of:
   (a) generating a plurality of functions wherein a predetermined number of said functions having a characteristic for providing a compressed pulse with a predetermined mainlobe to sidelobe ratio and a predetermined number of said functions having a characteristic for providing a compressed pulse with a predetermined pulse width;
   (b) scaling said plurality of functions for emphasizing the particular characteristic of each;
   (c) optimally combining said scaled plurality of functions into a single waveform; and
   (d) correcting for Doppler shift degradation in said waveform.

12. The method for generating a scaled multiple function non-linear FM waveform according to claim 11, wherein said step of generating a plurality of functions comprises generating a plurality of tangent functions wherein each tangent function scales the amplitude to a specified bandwidth and the angle endpoint to a specified pulse width.

13. The method for generating a scaled multiple function non-linear FM waveform according to claim 12, wherein said step of scaling said plurality of functions comprises multiplying each function by a scaling weight, wherein the sum of all scaling weights is equal to unity.

14. The method for generating a scaled multiple function non-linear FM waveform according to claim 13, wherein said step of optimally combining is a process comprising summing said plurality of tangent functions for varying tangent angle endpoints according to the equation given by $$\omega = 2\pi \left[ f_o t - \frac{BW^*T}{4} \sum_{i=1}^{4} W_i \frac{\ln \left| \cos \left( \alpha_i \left( \frac{2t}{T} - 1 \right) \right) \right|}{\alpha_i{}^* \tan \alpha_i} \right],$$

wherein $\omega$ is the phase of the single waveform.

15. The method for generating a scaled multiple function non-linear FM waveform according to claim 11, wherein said step of correcting Doppler shift degradation comprises weighting said plurality of functions to compensate for mainlobe to sidelobe level degradation due to a particular Doppler shift frequency.

16. The method for generating a scaled multiple function non-linear FM waveform according to claim 11, wherein said step of correcting Doppler shift degradation comprises adjusting the tangent angle endpoints to compensate for mainlobe to sidelobe level degradation due to a particular Doppler shift frequency.

17. The method for generating a scaled multiple function non-linear FM waveform according to claim 15, wherein said step of weighting comprises multiplying each function by a weighting factor, wherein said weighting factors are selected as a function of Doppler shift frequency.

18. The method for generating a scaled multiple function non-linear FM waveform according to claim 11, wherein said step of generating a plurality of functions comprises generating a plurality of polynomials of odd order.

* * * * *